United States Patent [19]

Kim

[11] Patent Number: 5,201,066
[45] Date of Patent: Apr. 6, 1993

[54] RADIO-TELEPHONE SYSTEM EMPLOYING A MANNER OF CHANGING A CHANNEL AND A PRIVACY DIGITAL CODE AND INTERSTORING THEM BETWEEN A STATIONARY APPARATUS AND A PORTABLE APPARATUS BY WIRELESS AND A METHOD OF CHANGING THE PRIVACY DIGITAL CODE

[75] Inventor: Won B. Kim, Seoul, Rep. of Korea

[73] Assignee: Hyundai Electronics Industries Co., Ltd., Kyoungkido, Rep. of Korea

[21] Appl. No.: 733,293

[22] Filed: Jul. 22, 1991

[30] Foreign Application Priority Data

Jul. 25, 1990 [KR] Rep. of Korea .............. 1990-11321

[51] Int. Cl.$^5$ .............................................. H04B 1/38
[52] U.S. Cl. .................................. 455/89; 455/185.1; 455/186.1
[58] Field of Search ................ 455/185, 186.1, 89, 455/88

[56] References Cited

U.S. PATENT DOCUMENTS

| | | | |
|---|---|---|---|
| 4,403,344 | 9/1983 | Yamada et al. ............ | 455/186.1 |
| 4,593,155 | 6/1986 | Hawkins .................... | 455/89 |
| 5,012,234 | 4/1991 | Dulaney et al. ........... | 455/186.1 |

Primary Examiner—Reinhard J. Eisenzopf
Assistant Examiner—Christine K. Belzer
Attorney, Agent, or Firm—Darby & Darby

[57] ABSTRACT

A radio-telephone system employing a manner of changing a channel and a privacy digital code and interstoring them between by wireless and a method of changing the privacy digital code. The radio-telephone system comprises a stationary apparatus 100 and a portable apparatus 200. The stationary apparatus 100 includes a base MPU 410 containing a ROM, a charging power supply and sensing circuit 450, a transmitting and receiving PLL circuit 420, a duplex radio transmitting and receiving unit 430, a line connecting circuit 460 and an antenna A. The portable apparatus 200 includes a hand MPU 610 containing a RAM, a transmitting and receiving PLL circuit 620, a duplex radio transmitting and receiving unit 630, a charging circuit 680 and an antenna A'. The method of changing the privacy digital code is performed by using the radio-telephone system. Therefore, in accordance with the present invention, the selection of the talk channel having no crosstalk by the system software is enabled. In addition, first in confirmation of a identification code in decision of the talk channel, a misconnection between the stationary and portable apparatus in the course of a talker's talking over the telephone can be prevented.

8 Claims, 14 Drawing Sheets

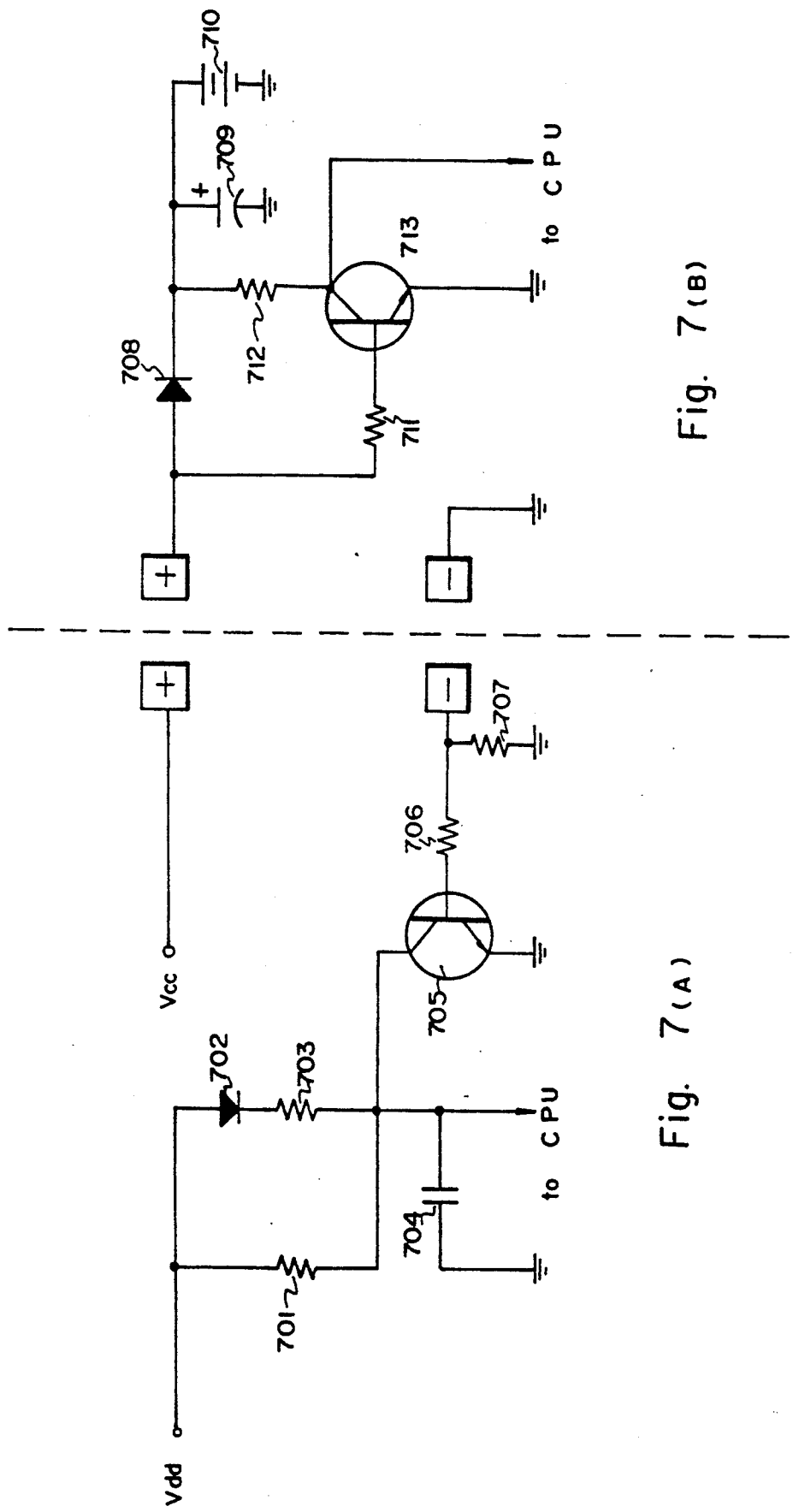

FRAME I

FRAME II

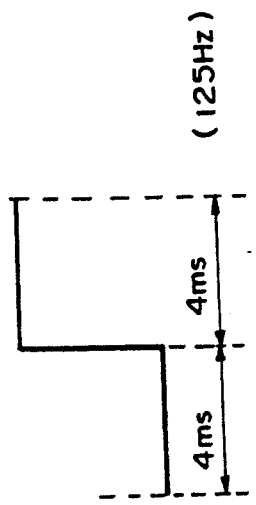
Fig. 9(A) high (1) bit
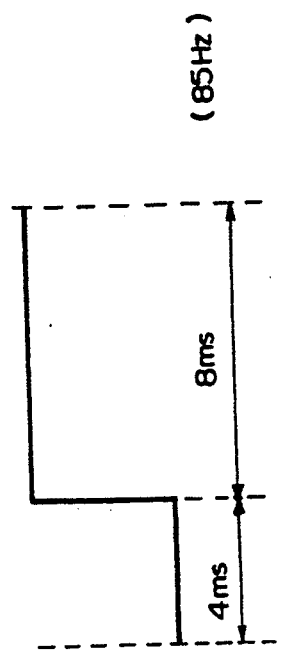
Fig. 9(B) low (0) bit

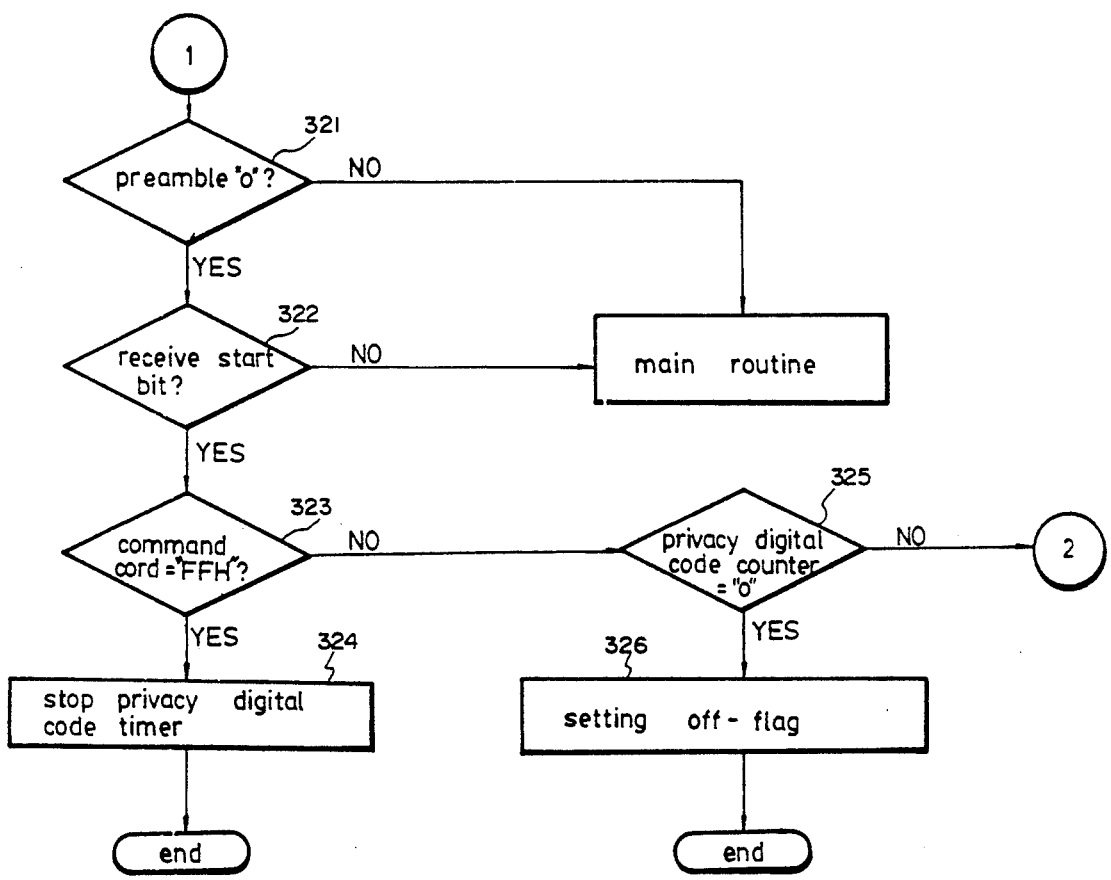

RADIO-TELEPHONE SYSTEM EMPLOYING A MANNER OF CHANGING A CHANNEL AND A PRIVACY DIGITAL CODE AND INTERSTORING THEM BETWEEN A STATIONARY APPARATUS AND A PORTABLE APPARATUS BY WIRELESS AND A METHOD OF CHANGING THE PRIVACY DIGITAL CODE

BACKGROUND OF THE INVENTION

1. Field of the Invention

The present invention relates in general to a radio-telephone system having a stationary apparatus and a portable apparatus, for intercommunication between the both apparatus by wireless and a method of performing the intercommunication between the both apparatus by wireless, and more particularly to a radio-telephone system employing a manner of changing a channel and a privacy digital code and interstoring them between the both apparatus by wireless, for transmitting the privacy digital code from the stationary apparatus to the portable apparatus through their antennas by wireless and storing the privacy digital code into a RAM in the portable apparatus, when the portable apparatus is put on the stationary apparatus for the charging of its battery and a method of changing the privacy digital code.

2. Description of the Prior Art

Generally, a radio-telephone system having a stationary apparatus and a portable apparatus is believed to hold a privacy digital code in order to prevent an unlawful use thereof and a misconnection between the both apparatus.

In a conventional channel-fixed radio-telephone system, there has not been present any alternative plan to a severe crosstalk in the course of a talker's talking over the telephone. Also, the system could not solve the problems of misconnection between the both apparatus in the talker's trying to talk over the telephone because of its holding no privacy digital code, and therefore of the overcharge for the telephone call.

Also, there has been known another conventional radio-telephone system provided with Manchester Code, encoder/decoder chips for embodying the holding of the privacy digital code in the operation of dip switches corresponding to a predetermined number of digital code bits. In this system, however, the change of the digital codes was allowed very restrictively in view of economic conditions for a system hardware and of the number of digital code bits and, as well, the dip switches for the stationary and portable apparatus was inconvenient to use due to their manual operations.

Conventional radio-telephone systems adopted for the improvement in the above-mentioned problems with above systems will be mentioned hereinafter with reference to FIGS. 1 and 2.

Referring to FIG. 1 which is a block diagram of a construction of a conventional radio-telephone system issued to MOTOROLA Co., Ltd, U.S.A., this conventional radio-telephone system is shown to comprise a stationary apparatus and a portable apparatus each including a microprocessor, a memory, two (+,−) charging terminals and a separate coding terminal ID. This system is adapted to send a predetermined privacy digital code from the stationary apparatus out to the portable apparatus via the coding terminal ID and then store it into the memory in the portable apparatus, when the predetermined privacy digital code is previously programmed in the memory in the stationary apparatus and the portable apparatus is thereafter put on the stationary apparatus for the charging of its battery.

Turning to FIG. 2 which is a block diagram of a construction of another conventional radio-telephone system issued to AT&T Co., Ltd, U.S.A., this conventional radio-telephone system is shown to comprise a stationary apparatus and a portable apparatus, each including a control circuit containing a memory, two (+,−) charging terminals and a charging, data transfer and cradle status circuit connected between the control circuit and the two charging terminals, with removing the separate coding terminal ID from the above-mentioned system. This system is adapted to send a predetermined privacy digital code from the stationary apparatus out to the portable apparatus via the (+) charging terminals, not via the coding terminal ID in the above-mentioned conventional system and then store it into the memory in the portable apparatus, when the predetermined digital code is previously programmed in the memory in the stationary apparatus and the portable apparatus is thereafter put on the stationary apparatus for the charging of its battery.

However, in the former system, the installation of the separate coding terminal therein results in its structural complexity and in the latter system, the additional installation of the charging, data transfer and cradle status circuit therein results in its structural complexity and a heavy economic burden thereof. In addition, in both systems, the use of expensive EEPROMs in which each of equally programmed privacy digital codes is stored, in both of the stationary and portable apparatus results in an increase in the economic burden thereof.

SUMMARY OF THE INVENTION

Therefore, it is an object of the present invention to provide a radio-telephone system employing a manner of changing a channel and a privacy digital code and interstoring them between a stationary apparatus and a portable apparatus by wireless, for transmitting the privacy digital code from the stationary apparatus to the portable apparatus through their antennas by wireless and storing the privacy digital code into a random access memory (RAM) in a microprocessor in the portable apparatus, when a predetermined number of bits of the privacy digital code is previously programmed softwarely in a read only memory (ROM) in a microprocessor in the stationary apparatus and the portable apparatus is thereafter put on the stationary apparatus for the charging of its battery, so that the problem of limits of the number of the privacy digital code bits can be solved without separate, additional circuits, a coding data path can be separated from a charging path in order to enhance their independent, own functions, and the privacy digital code of the bit number above $2^{20}$ can be used by the programming techniques.

It is another object of the present invention to provide a method of changing the privacy digital code by using said radio-telephone system.

In accordance with one aspect of the present invention, there is provided a radio-telephone system employing a manner of changing a channel and a privacy digital code and interstoring them by wireless, said system having a stationary apparatus connected to a standard telephone line and a portable apparatus connected by wireless to the stationary apparatus for transmission and reception of voice and data, said stationary and portable apparatus each having (+, −) charging terminals, wherein said stationary apparatus comprising: base MPU means containing a first ROM for storing a software of controlling the whole operation of the system; charging power supply and sensing means connected between said base MPU means and said stationary apparatus (+,−) charging terminals, for supplying a charging power to said stationary apparatus (+,−) charging terminals and sensing a contact of said stationary apparatus (+,−) charging terminals with said portable apparatus (+,−) charging terminals to output an acknowledge signal in accordance with the sensed result to said base MPU means; first duplex radio transmitting and receiving means connected to said base MPU means, for transmitting and receiving a generic voice signal and transmitting a selected channel and privacy digital code data to said portable apparatus and receiving reception completion signal data from said portable apparatus under a control of said base MPU means; first transmitting and receiving PLL means connected to said base MPU means and to said first duplex radio transmitting and receiving means, for determining a plurality of transmission and reception channel frequencies in accordance with channel data from said base MPU means and removing a frequency error in a PLL manner to perform a channel locking; line connecting means connected among said base MPU means, said first duplex radio transmitting and receiving means and said standard telephone line, for providing intercommunication with a generic telephone network; and first antenna means connected to said first duplex radio transmitting and receiving means; and wherein said portable apparatus comprising: hand MPU means containing a first RAM for storing the privacy digital code given by said base MPU means in said stationary apparatus; second duplex radio transmitting and receiving means connected to said hand MPU means, for receiving the selected channel and the privacy digital code data transmitted from said stationary apparatus in the charging of its battery and performing the signal transmission and reception from and/or to said stationary apparatus having the same code; second transmitting and receiving PLL means connected to said hand MPU means and to said second duplex radio transmitting and receiving means, for determining a plurality of transmission and reception channel frequencies in accordance with channel data from said hand MPU means and removing a frequency error in a PLL manner to perform a channel locking; charging means connected to said portable apparatus (+,−) charging terminals, for supplying a charged power to said hand MPU means and said second duplex radio transmitting and receiving means; and second antenna means connected to said second duplex radio transmitting and receiving means.

In accordance with another aspect of the present invention, there is provided a method of changing the privacy digital code by using said radio-telephone system, comprising the steps of: (a) setting said second RAM to zero, clearing all flags to zero, performing a privacy digital code get routine, designating an initial value and performing a charging delay for a constant time period, during the contact between said charging terminals of said stationary and portable apparatus for the charging of the battery, in said stationary apparatus; and performing a first RAM clear routine and designating an initial value, in said portable apparatus; (b) checking if the charging state is continuously maintained after the charging delay for the constant time period, in said stationary apparatus; (c) performing a privacy digital code transmitting program, in said stationary apparatus; and performing a receiving main routine, in said portable apparatus; (d) checking whether a preamble and a start bit are present among data received by wireless from said stationary apparatus, storing the privacy digital code in a receiving buffer if a preamble and a start bit are present among the received data from said stationary apparatus, determining if command data existing among the received data is in accord with privacy digital code change request data, performing a privacy digital code change completion data transmitting program if the command data existing among the received data is in accord with the privacy digital code change request data, comparing the privacy digital code in said receiving buffer with contents in said first RAM if the command data existing among the received data is not in accord with the privacy digital code change request data, and performing an operation according to the command data only when the privacy digital code in said receiving buffer is in accord with contents in said first RAM, in said portable apparatus; and (e) checking whether a preamble and a start bit are present among data received by wireless from said portable apparatus and 322 and then whether the privacy digital code change completion data has been received, and unless the privacy digital code change completion data is received, performing repeatedly a transmitting operation of the privacy digital code change request data until the privacy digital code change completion data is received, in said stationary apparatus.

BRIEF DESCRIPTION OF THE DRAWINGS

The above and other objects, features and advantages of the present invention will be more clearly understood from the following detailed description taken in conjunction with the accompanying drawings, in which:

FIG. 7A is a detailed circuit diagram of a charging detecting circuit in the stationary apparatus concerned with the charging of a battery in FIG. 6;

FIG. 7B is a detailed circuit diagram of a charging detecting circuit in the portable apparatus concerned with the charging of the battery in FIG. 6;

FIGS. 9A and 9B illustrate constructions of one bit of transmission data and one bit of reception data, respectively, according to the present invention; and FIGS. 10A through 10F are flowcharts relating to the transmission and reception of the privacy digital code in the charging of the battery in FIG. 6, according to the present invention.

DETAILED DESCRIPTION OF PREFERRED EMBODIMENTS

Figure 1:
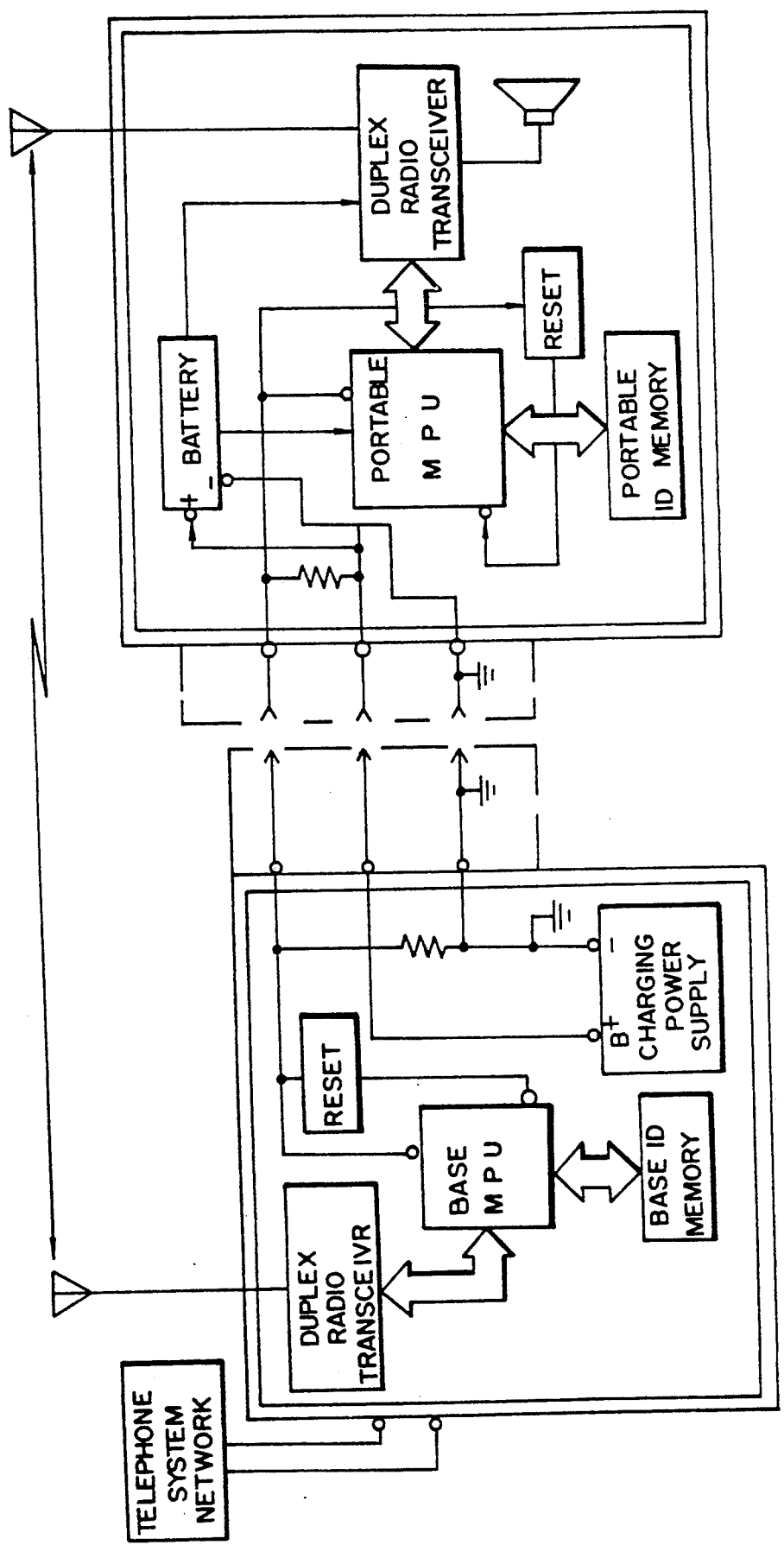
FIG. 1 is a block diagram of a construction of a conventional radio-telephone system.
Figure 2:
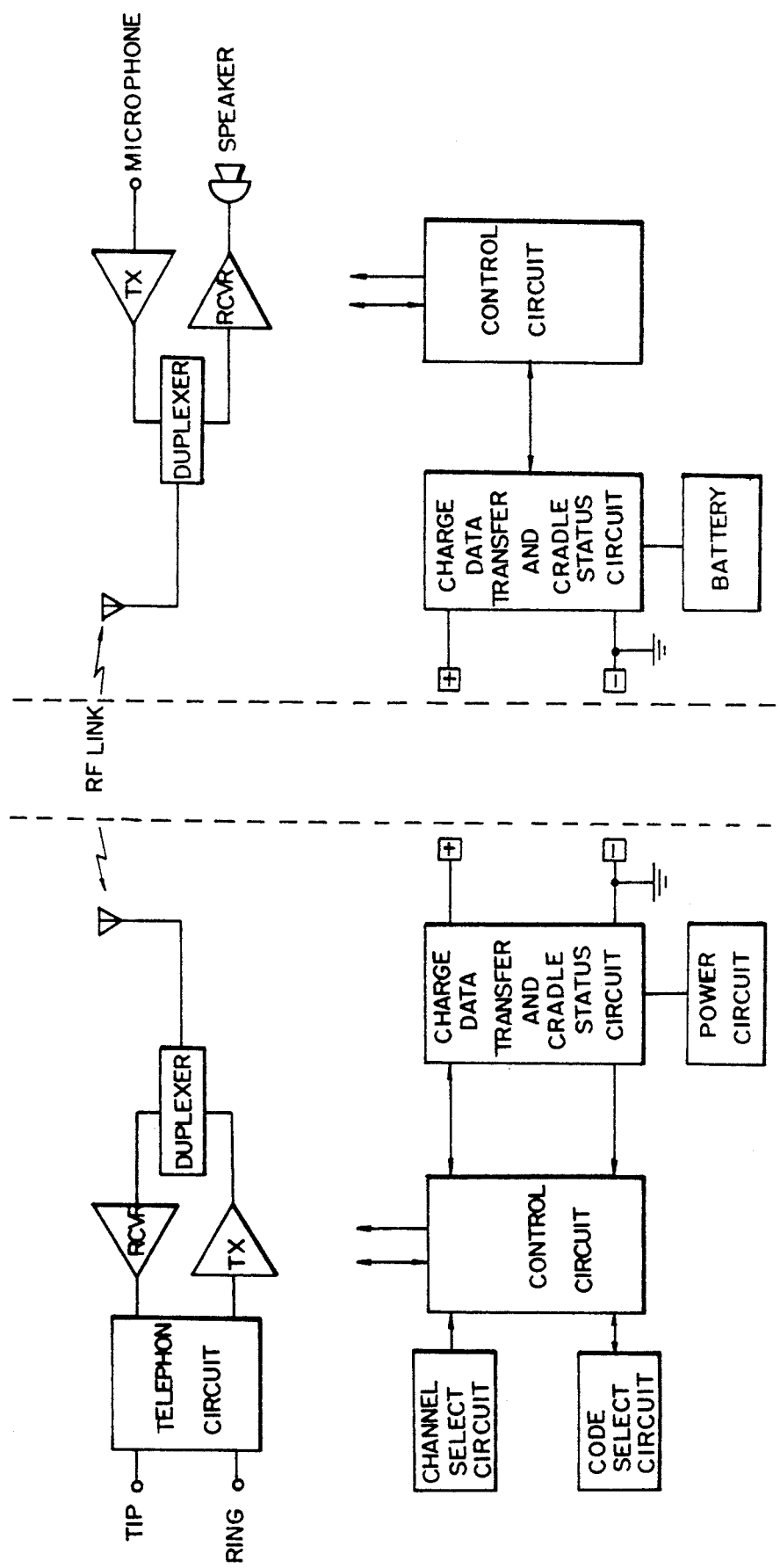
FIG. 2 is a block diagram of a construction of another conventional radio-telephone system.
Figure 3:
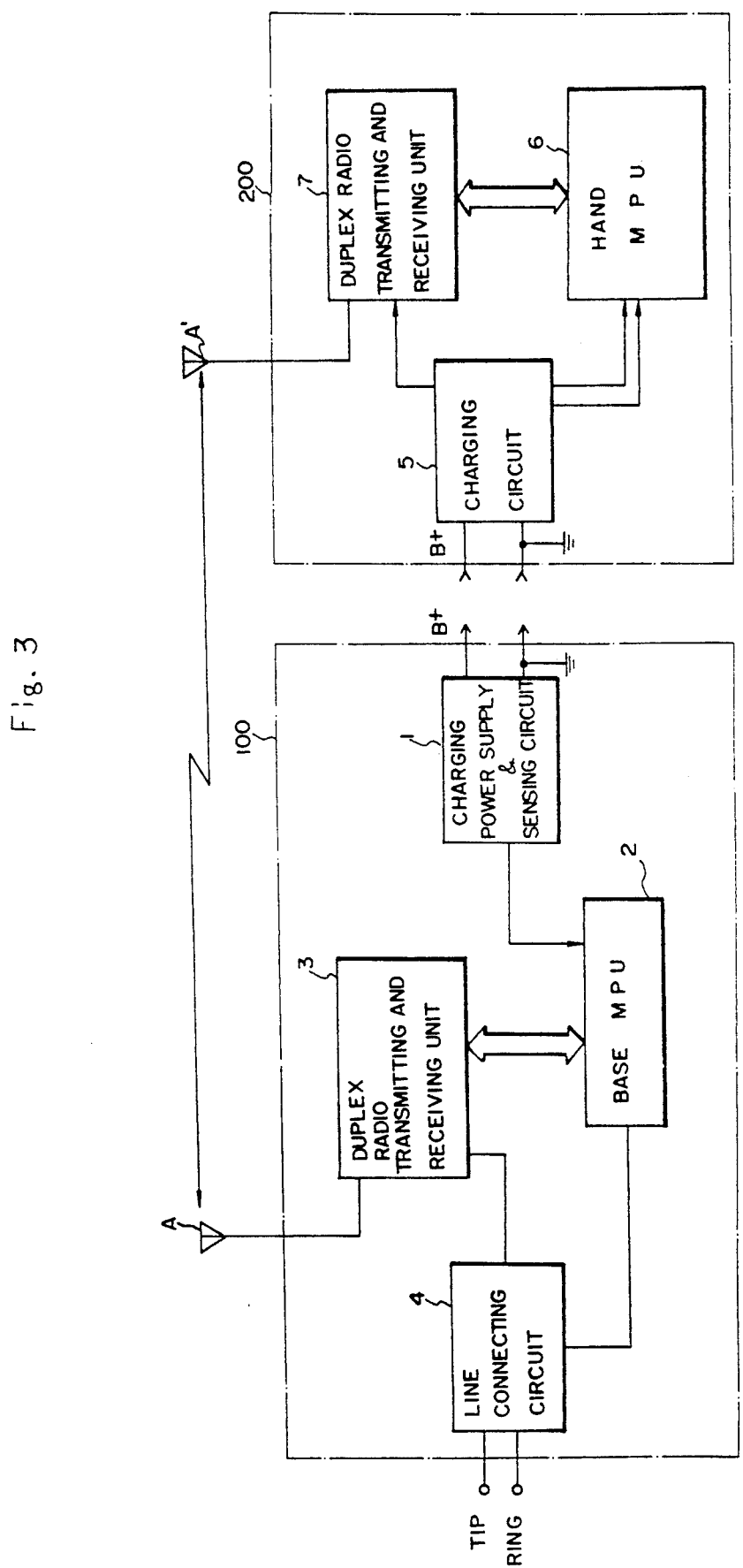
FIG. 3 is a schematic block diagram of a construction of a radio-telephone system in accordance with the present invention.

FIG. 3 is a schematic block diagram of a construction of a radio-telephone system in accordance with the present invention. In this drawing, the reference numeral 100 designates a stationary apparatus, 1 a charging power supply and sensing circuit, 2 a microprocessor unit, referred to hereinafter as a base MPU, 3 a duplex radio transmitting and receiving unit, 4 a line connecting circuit, A an antenna, 200 a portable apparatus, 5 a charging circuit, 6 a microprocessor unit, referred to hereinafter as a hand MPU, 7 a duplex radio transmitting and receiving unit, and A' an antenna, respectively.

Referring to FIG. 3, a radio-telephone system in accordance with the present invention is shown to comprise a stationary apparatus 100 and a portable apparatus 200, each having (+,−) charging terminals.

The stationary apparatus 100 includes a base MPU 2 containing a ROM, a charging power supply and sensing circuit 1 connected between the base MPU 2 and the stationary apparatus 100 (+,−) charging terminals, for supplying a charging power to the stationary apparatus 100 (+,−) charging terminals and sensing a contact of the stationary apparatus 100 (+,−) charging terminals with the portable apparatus 200 (+,−) charging terminals to output an acknowledge signal in accordance with the sensed result to the base MPU 2, a duplex radio transmitting and receiving unit 3 connected to the base MPU 2, for transmitting a privacy digital code to the portable apparatus 200 under a control of the base MPU 2 if the charging power supply and sensing circuit 1 senses the contact of the stationary apparatus 100 (+,−) charging terminals with the portable apparatus 200 (+,−) charging terminals and performing the signal transmission and reception from and/or to the portable apparatus 200 having the same code, a line connecting circuit 4 connected to the base MPU 2 and the duplex radio transmitting and receiving unit 3, for connecting the system of the present invention to an existing public service telecommunication network (PSTN), and an antenna A connected to the duplex radio transmitting and receiving unit 3, for the signal transmission and reception of the unit 3.

The portable apparatus 200 includes a hand MPU 6 containing a RAM for storing the privacy digital code given by the base MPU 2 in the stationary apparatus 100, a duplex radio transmitting and receiving unit 7 connected to the hand MPU 6, for receiving the privacy digital code transmitted from the stationary apparatus 100 in the charging of its battery and performing the signal transmission and reception from and/or to the stationary apparatus 100 having the same code, a charging circuit 5 connected to the portable apparatus 200 (+,−) charging terminals, for supplying a charged power to the hand MPU 6 and the duplex radio transmitting and receiving unit 7, and an antenna A' connected to the duplex radio transmitting and receiving unit 7, for the signal transmission and reception of the unit 7.

The operation of changing a channel and the privacy digital code and interstoring them between the stationary apparatus 100 and the portable apparatus 200 by wireless according to the present invention will now be described in detail with reference to timing diagrams of FIGS. 4A through 4E.

Usually, in the radio-telephone system, the portable apparatus 200 is always put on the stationary apparatus 100 for the charging of its battery. If the stationary apparatus 100 (+,−) charging terminals are in contact with the portable apparatus 200 (+,−) charging terminals, the charging power supply and sensing circuit 1 senses that contact and transfers a signal in accordance with the sensed result to the base MPU 2. Herein, while the charging power supply and sensing circuit 1 outputs the sensed signal to the base MPU 2 during a time period T in FIG. 4A, a transmission enable state that the base MPU 2 can transmit transmission on data depending on the applying of power Vdd to the duplex radio transmitting and receiving unit 3 is maintained during a time period T1 in FIG. 4B.

Figure 4:
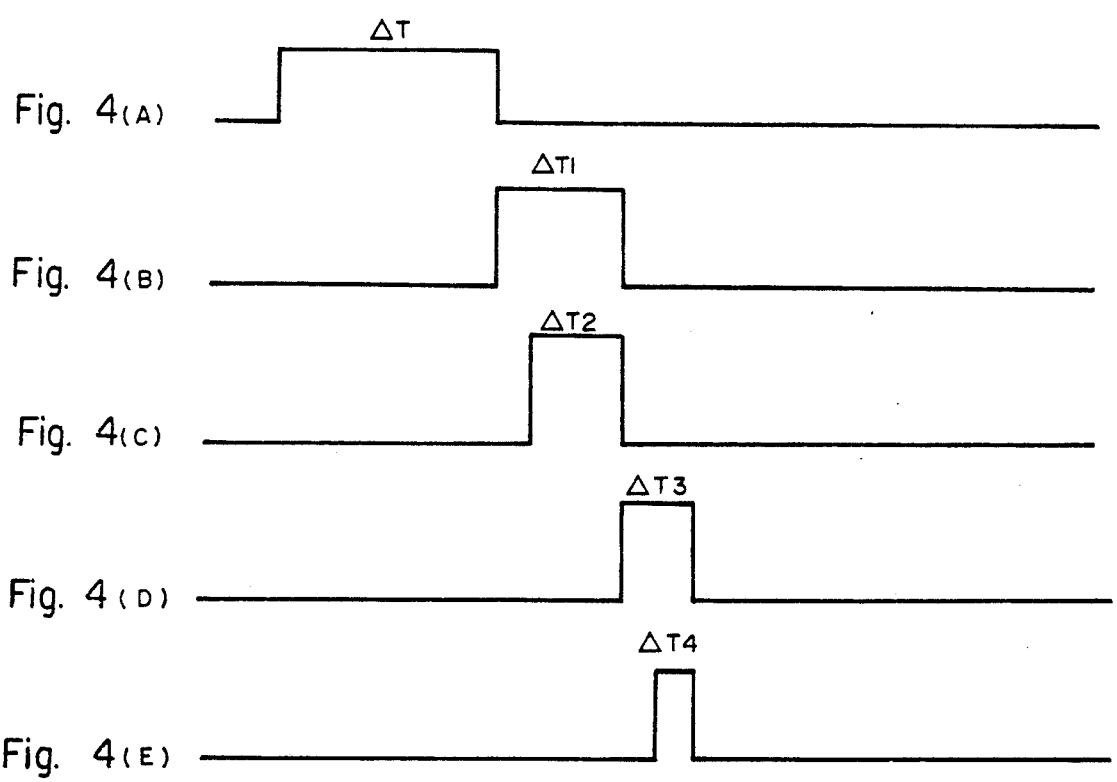
FIGS. 4A through 4E are timing diagrams relating to the change of a channel and a privacy digital code and the interstorage of them, according to the present invention.

While the transmission enable state is maintained during the time period T1 in FIG. 4B, during a time period T2 in FIG. 4C the base MPU 2 outputs a start channel and the privacy digital code data incremented by the number of one bit to the antenna A' in the portable apparatus 200 through a transmitting circuit Tx in the duplex radio transmitting and receiving unit 3 and therefore through the antenna A.

On the other hand, upon receiving the start channel and the privacy digital code data incremented by the number of one bit from the stationary apparatus 100, the antenna A' in the portable apparatus 200 transfers them to the hand MPU 6 via the duplex radio transmitting and receiving unit 7.

During a time period T3 in FIG. 4D, a transmission enable state that the hand MPU 6 can transmit transmission on data depending on the applying of power Vdd to the duplex radio transmitting and receiving unit 7 is maintained.

While the transmission enable state is maintained during the time period T3 in FIG. 4D, during a time period T4 in FIG. 4E the hand MPU 6 outputs an acknowledge signal, indicating that the start channel and the privacy digital code data transmitted from the stationary apparatus 100 have been received, to the antenna A in the stationary apparatus 100 through a transmitting circuit Tx in the duplex radio transmitting and receiving unit 7 and therefore through the antenna A'.

Upon receiving the acknowledge signal from the portable apparatus 200, the antenna A in the stationary apparatus 100 transfers the acknowledge signal to the hand MPU 2 via the duplex radio transmitting and receiving unit 3. Then, the procedure of changing the start channel and the privacy digital code and interstoring them between the stationary apparatus 100 and the portable apparatus 200 by wireless according to the present invention is completed.

Therefore, the stationary apparatus 100 and the portable apparatus 200 are allowed to have the same channel and privacy digital code, thereby enabling the transmission and reception between the both apparatus. As a result, upon having taken the portable apparatus 200 in their hands and having pushed its talk buttons, the talkers can talk over the telephone between each other.

Also, every time the portable apparatus 200 is put on the stationary apparatus 100, new data is stored in the RAM in the base MPU 2 of the stationary apparatus 100, so that the portable apparatus 200 can always be given a new privacy digital code.

Figure 5:
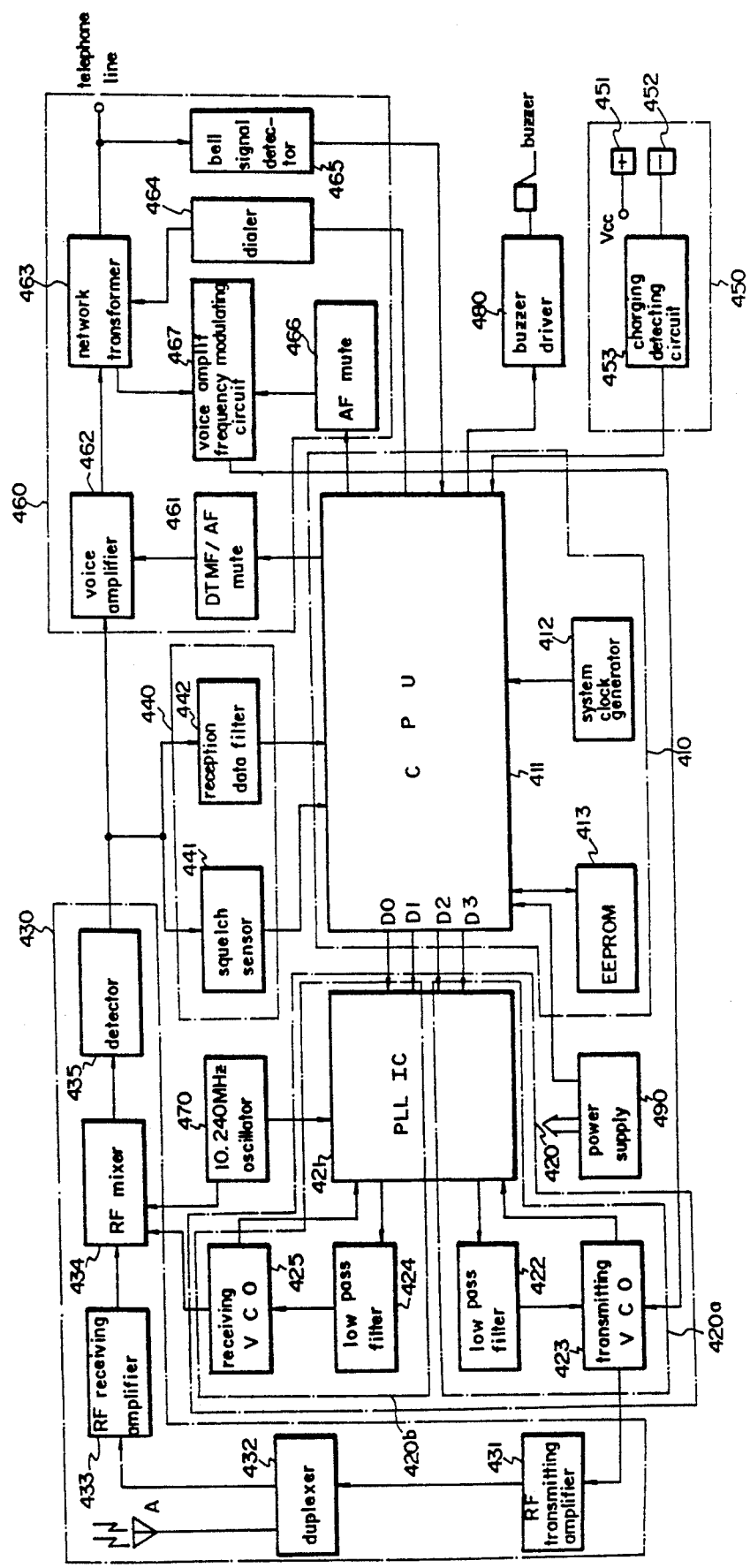
FIG. 5 is a detailed block diagram of a stationary apparatus in FIG. 3.

FIG. 5 is a detailed block diagram of the stationary apparatus 100 in the radio-telephone system according to the present invention. In this drawing, the reference numeral 410 designates a base MPU, 420 a transmitting and receiving PLL circuit, 430 a duplex radio transmitting and receiving unit, 440 a squelch and reception data filtering circuit, 450 a charging power supply and sensing circuit, 460 a line connecting circuit, 470 a 10.240 MHz oscillator, 480 a buzzer driver, and 490 a power supply, respectively.

Referring to FIG. 5, the base MPU 410 is shown to comprise a CPU 411, a system clock generator 412 and an EEPROM 413.

The CPU 411 is one chip CPU such as, for example, a CMOS. The CPU 411 of the preferred embodiment of the present invention can be implemented utilizing a Model MC68HC05P1-P available from MOTOROLA Co., Ltd, U.S.A. The CPU 411 contains a ROM and a RAM therein. The ROM in the CPU 411 stores the sequence time for control of the whole operation of the system as a machine code. This machine coded software enables a frequency division multiplexing communication and a basic data communication, and also generates a tone pulse signal for dialing.

Therefore, the CPU 411 controls the whole system operation by a system program contained therein and prevents a misconnection between the stationary and portable apparatus 100 and 200 in the course of a talker's talking over the telephone by a identification code contained therein.

The system clock generator 412 is a 2 MHz resonator connected to the CPU 411, for generating a 2 MHz system clock and outputting the system clock to the CPU 411.

The electrically erasable and programmable ROM (EEPROM) 413 is a memory unit for electrically erasing or programming its content. The EEPROM 413 of the preferred embodiment of the present invention can be implemented utilizing a Model HY93C46 available from HYUNDAI Co., Ltd, the Republic of Korea.

The EEPROM 413 is connected to the CPU 411, for storing ten of desired telephone numbers, not exceeding 22 figures, through a key pad (see FIG. 6) of the portable apparatus 200, thereby enabling the one-touch dialing for the ten of desired telephone numbers.

The transmitting and receiving phase-locked loop (PLL) circuit 420 is provided with a radio-telephone system dedicated PLL IC 421, preferably, Model NPC 5130AP, and peripheral devices. Also, the transmitting and receiving PLL circuit 420 includes a transmitting PLL circuit 420a and a receiving PLL circuit 420b.

The transmitting PLL circuit 420a is provided with a transmitting part of the radio-telephone system dedicated PLL IC 421, a low pass filter 422 connected to the PLL IC 421, and a transmitting voltage-controlled oscillator (VCO) 423 connected to the PLL IC 421 and the low pass filter 422.

The radio-telephone system dedicated PLL IC 421 determines a frequency dividing ratio of a reference frequency signal in accordance with channel data from the CPU 411 and generates transmission and reception frequency signals corresponding to channels 1 to 10 according to the determined frequency dividing ratio.

Upon being applied with a transmitting power, the transmitting part of the ratio-telephone system dedicated PLL IC 421 operates to excite the transmitting VCO 423 to free-run. Then, a free-run frequency signal from the free-running transmitting VCO 423 is applied to an input terminal of the PLL IC 421.

The radio-telephone system dedicated PLL IC 421 frequency-divides the signal received from the transmitting VCO 423 by the previously determined frequency dividing ratio in accordance with channel information from the CPU 411, compares a phase of the frequency-divided signal with a phase of the reference frequency signal and outputs the phase difference to the low pass filter 422.

The low pass filter 422 filters the phase difference received from the PLL IC 421 and again applies the filtered phase difference to the transmitting VCO 423 for the locking of the free-run frequency according to the frequency variation.

The receiving PLL circuit 420b is provided with a receiving part of the radio-telephone system dedicated PLL IC 421, a low pass filter 424 connected to the PLL IC 421, and a receiving voltage-controlled oscillator (VCO) 425 connected to the PLL IC 421 and the low pass filter 424.

Upon being applied with a receiving power, the receiving part of the radio-telephone system dedicated PLL IC 421 operates to excite the receiving VCO 425 to free-run. Then, a free-run frequency signal from the free-running receiving VCO 425 is applied to the other input terminal of the PLL IC 421.

The radio-telephone system dedicated PLL IC 421 frequency-divides the signal received from the receiving VCO 425 by the previously determined frequency dividing ratio in accordance with channel data from the CPU 411, compares a phase of the frequency-divided signal with a phase of the reference frequency signal and outputs the phase difference to the low pass filter 424.

The low pass filter 424 filters the phase difference received from the PLL IC 421 and again applies the filtered phase difference to the receiving VCO 425 for the locking of the free-run frequency according to the frequency variation.

The duplex ratio transmitting and receiving unit 430 is provided with a duplexer 432 connected to the antenna A, a radio frequency (RF) transmitting amplifier 431 connected between an output terminal of the transmitting VCO 423 in the transmitting and receiving PLL circuit 420 and the duplexer 432, a RF receiving amplifier 433 connected to the duplexer 432, a RF mixer 434 connected to an output terminal of the RF receiving amplifier 433 and to an output terminal of the receiving VCO 425 in the transmitting and receiving PLL circuit 420, and a detector 435 connected to the RF mixer 434.

The duplexer 432 is a bidirectional transmission circuit capable of simultaneously transmitting and receiving data. The duplexer 432 transfers an output signal from the RF transmitting amplifier 431 to the antenna A, filters a RF reception signal received from the antenna A through a 49 MHz band pass filter (not shown) contained therein and outputs the filtered RF reception signal to the RF receiving amplifier 433.

The RF transmitting amplifier 431 amplifies a RF transmission signal received from the transmitting VCO 423 in the transmitting PLL circuit 420a through a buffer amplifying circuit and a power amplifying circuit (not shown) contained therein, the RF transmission signal being produced by a voice output signal from a voice amplifier and frequency modulator 467 being synthesized with the locked free-run frequency signal from the transmitting VCO 423, and outputs the amplified RF transmission signal to the duplexer 432.

The RF receiving amplifier 433 low-noise amplifies the RF reception signal received from the duplexer 432 through a RF amplifying circuit (not shown) contained therein and outputs the amplified RF reception signal to the RF mixer 434.

The RF mixer 434 mixes a first locked local frequency signal outputted from the receiving VCO 425 in the receiving PLL circuit 420b with the RF reception signal incoming from the antenna A to produce a first intermediate frequency signal of 10.7 MHz. Thereafter, the RF mixer 434 filters the first intermediate frequency signal of 10.7 MHz through a 10.7 MHz ceramic filter (not shown) contained therein and mixes the filtered first intermediate frequency signal with a reference run frequency signal of 10.240 MHz from the PLL IC 421 to produce a second intermediate frequency signal of 455 KHz.

The detector 435 amplifies the 455 KHz second intermediate frequency (IF) signal from the RF mixer 434, inverts the amplified signal and detects the inverted signal through a LC tank resonance circuit and a detecting circuit (not shown) contained therein.

The squelch and reception data filtering circuit 440 includes a squelch sensor 441 and a reception data filter 442 each connected between the detector 435 and the CPU 411.

The squelch sensor 441 when selection for a channel has been required at the start of talker's talking over the telephone or in the course of talker's talking over the telephone, i.e., when a channel selection button has been pushed, senses whether which of channels is not busy on the public line of telecommunication and informs the CPU 411 of the sensed result, so that the CPU 411 can select a idle channel. In the squelch sensor 441, there may be employed a variable resistor VR for adjusting an acceptable level of a carrier.

The reception data filter 442 includes a dual operational amplifier (OP-AMP) IC (not shown), preferably, Model LM358, and peripheral circuit (not shown), for filtering data received from the portable apparatus 200 and applying the filtered data to the CPU 411.

The charging power supply and sensing circuit 450 includes (+,−) charging terminals 451 and 452 for contact with (+,−) charging terminals of the portable apparatus 200 and a charging detecting circuit 453 connected between the (−) charging terminal 452 and the CPU 411.

A more detailed construction of the charging detecting circuit 453 will be mentioned hereinafter with reference to FIG. 7A.

Figure 6:
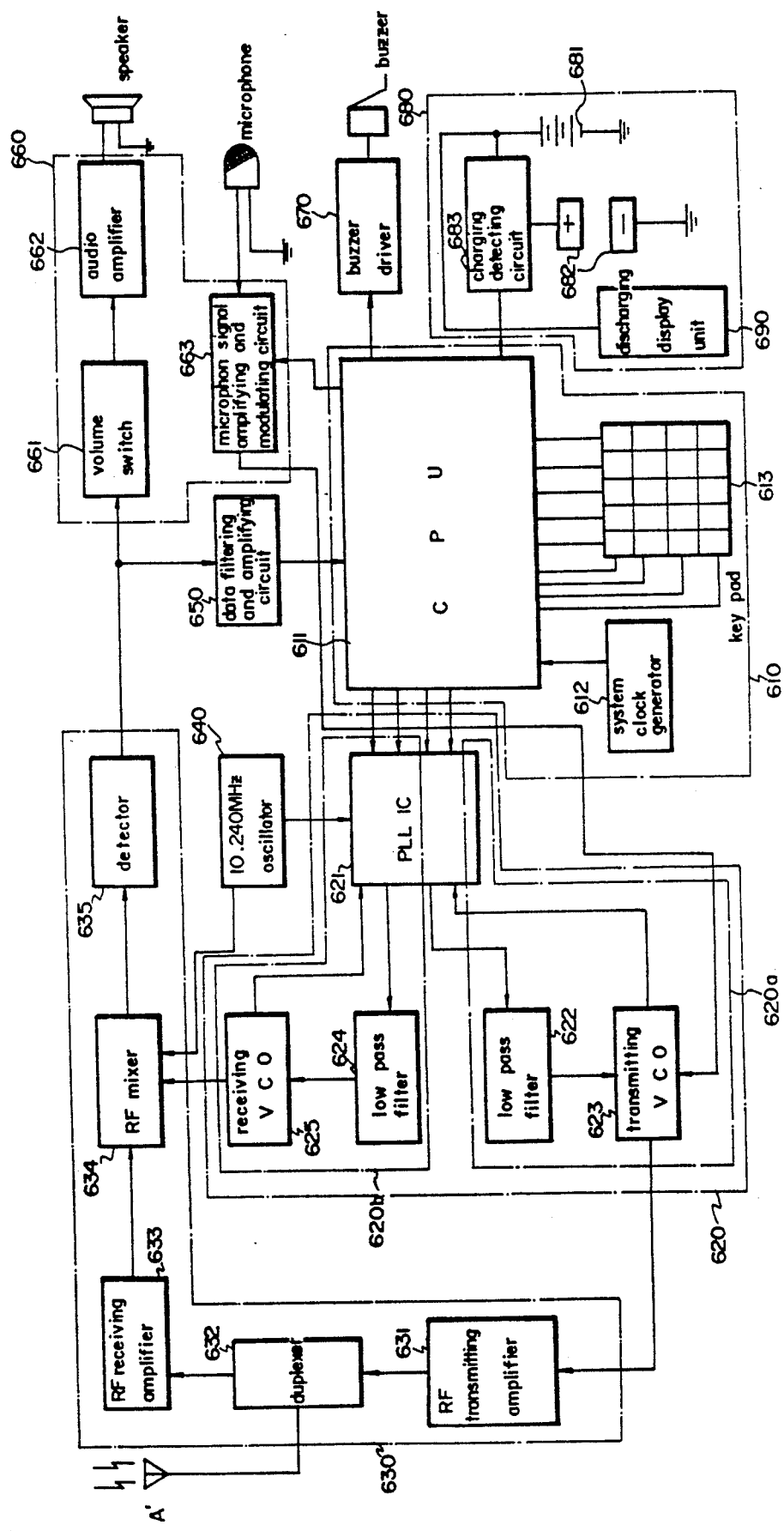
FIG. 6 is a detailed block diagram of a portable apparatus in FIG. 3.

FIG. 7A is a detailed circuit diagram of the charging detecting circuit 453 in the stationary apparatus 100 concerned with the charging of a battery in FIG. 6. As shown in this drawing, a charging power (+9 V) is fed to the (+) charging terminal 451 connected to a power source Vcc.

The charging detecting circuit 453 is provided with a ground resistor 707 connected to the (−) charging terminal 452, a base resistor 706 connected in parallel to the ground resistor 707, and a switching NPN transistor 705 including its base connected to the (−) charging terminal 452 via the base resistor 706, its emitter connected to ground and its collector connected to a power source Vdd via a resistor 701 and to a light emitting diode 702 and a resistor 703 connected in series. The light emitting diode 702 and the resistor 703 connected in series are also connected in parallel to the resistor 701. Also, to the collector stage of the transistor 705, a condenser 704 connected to ground and a charging detecting terminal of the CPU 411 are connected.

In the event that the (+,−) charging terminals are come into contact with each other, the transistor 705 at OFF state is turned on, so that a level of an acknowledge signal at a high state being applied to the CPU 411 can be turned into a low state and the light emitting diode 702 connected to the power source Vdd can be turned on.

The line connecting circuit 460 is adapted to connect the system of the present invention to a telephone line, in order to allow the system to perform its effective communication with the existing public service telecommunication network (PSTN). The line connecting circuit 460 includes a network transformer 463 connected to the telephone line, a bell signal detector 465 connected to the telephone line, a dual-tone multi-frequency/audio frequency (DTMF/AF) mute 461 connected to the CPU 411, a voice amplifier 462 including its input terminal connected to output terminals of the detector 435 and the DTMF/AF mute 461 and its output terminal connected to the network transformer 463, a dialer 464 including its input terminal connected to the CPU 411 and its output terminal connected to the network transformer 463, an audio frequency (AF) mute 466 connected to the CPU 411, and a voice amplifying and frequency modulating circuit 467 including its input terminal connected to the AF mute 466 and the network transformer 463 and its output terminal connected to the transmitting VCO 423 in the transmitting and receiving PLL circuit 420.

Upon receiving a bell signal from the external telephone line, the bell signal detector 465 rectifies the bell signal through a diode rectifying circuit (not shown) contained therein to change the bell signal into a direct current (DC) component and converts the DC component signal into a logic signal through a photo-coupler IC (not shown), preferably, Model PC817, contained therein. Then, the bell signal detector 465 outputs the logic signal to the CPU 411.

The network transformer 463 operates in accordance with a phase difference between an incoming signal voltage and an outgoing signal voltage to prevent the occurrence of a crosstalk in the course of the system's voice transmission and reception with the existing public service telecommunication network (PSTN). Namely, the network transformer 463 separates a voice signal received from the telephone line from a transmission voice signal from the voice amplifier 462 in accordance with a phase difference between the reception voice signal voltage and the transmission voice signal voltage and applies the transmission voice signal to the telephone line.

The voice amplifying and frequency modulating circuit 467 includes a voice band amplifying circuit (not shown) containing a transistor and peripheral devices, such as well-known in the art, and a FM modulating oscillator (not shown). The voice amplifying and frequency modulating circuit 467 operates to amplify through the voice band amplifying circuit the reception voice signal from the telephone line, separated from the transmission voice signal by the network transformer 463 and to modulate the amplified signal through a varicap diode in the FM modulating oscillator. Then, the voice amplifying and frequency modulating circuit 467 outputs the modulated signal to the transmitting VCO 423 in the transmitting PLL circuit 420a.

The voice amplifier 462 adjusts volume of a pure voice signal through a variable resistor (not shown) contained therein and amplifies the volume-adjusted voice signal. Then, the voice amplifier 462 applies the amplified voice signal to the network transformer 463 in order to transmit the amplified voice signal as a transmission voice signal over the telephone line.

The dialer 464 upon receiving dial pulse and DTMF signals from the CPU 411, i.e., when the CPU 411 outputs thereto the DTMF and dial pulse signals produced in accordance with the 2 MHz reference frequency drives a relay (not shown) contained therein to output the DTMF signal to the telephone line through the same path as that of the voice signal.

The 10.240 MHz oscillator 470 is connected to the PLL IC 421 in the transmitting and receiving PLL circuit 420 and to the RF mixer 434, for supplying the 10.240 MHz frequency to them.

The buzzer driver 480 is connected to the CPU 411, for driving a buzzer under the control of the CPU 411.

The power supply 490 is provided with an AC/DC adapter (not shown) and a constant voltage regulator IC (not shown), preferably, Model 7805, for supplying a stable power to the stationary apparatus. The power supply 490 supplies power to the whole circuits.

FIG. 6 is a detailed block diagram of the portable apparatus 200 in the radio-telephone system according to the present invention. In this drawing, the reference numeral 610 designates a hand MPU, 620 a transmitting and receiving PLL circuit, 630 a duplex radio transmitting and receiving unit, 640 a 10.240 MHz oscillator, 650 a data filtering and amplifying circuit, 660 an audio input/output circuit, 670 a buzzer driver, 680 a charging circuit and 690 a discharging display unit, respectively.

Referring to FIG. 6, the hand MPU 610 is shown to comprise a CPU 611, a system clock generator 612 and a keypad 613.

The CPU 611 is one chip CPU such as, for example, a CMOS. The CPU 611 of the preferred embodiment of the present invention can be implemented utilizing a Model MC68HC05P1-P available from MOTOROLA Co., Ltd, U.S.A. The CPU 611 contains a ROM and a RAM therein. Also, the CPU 611 performs a control relating to data transmission and reception of the portable apparatus 200 during data communication with the stationary apparatus 100. The ROM in the CPU 611 stores a system software. The RAM in the CPU 611 stores a fixed constant and a variable constant as data. These data are received from the stationary apparatus 100 to the CPU 100 in the portable apparatus 200 via peripheral data filter circuits.

The system clock generator 612 is a 2 MHz resonator connected to the CPU 611, for generating a 2 MHz system clock and outputting the system clock to the CPU 611.

The keypad 613 is connected to the CPU 611 and functions as an input device for operating to allow the CPU 611 to perceive functions such as numeral dial, TALK, SCAN, MEMO, CALL, PAUSE, REDIAL and FLASH and to control the functions by the system software contained therein.

The transmitting and receiving phase-locked loop (PLL) circuit 620 is provided with a PLL IC 621, preferably, Model NPC 5/13AP, and peripheral devices. Also, the transmitting and receiving PLL circuit 620 includes a transmitting PLL circuit 620a and a receiving PLL circuit 620b. The construction and operation of the transmitting and receiving PLL circuit 620 are identical to those of the transmitting and receiving PLL circuit 420 in FIG. 5 and hence those will not be described in detail.

The duplex radio transmitting and receiving unit 630 is provided with a duplexer 632 connected to the antenna A', a radio frequency (RF) transmitting amplifier 631 connected between an output terminal of the transmitting VCO 623 in the transmitting PLL circuit 620a in the transmitting and receiving PLL circuit 620 and the duplexer 632, a RF receiving amplifier 633 connected to the duplexer 632, a RF mixer 634 connected to an output terminal of the RF receiving amplifier 633 and to an output terminal of the receiving VCO 625 in the receiving PLL circuit 620b in the transmitting and receiving PLL circuit 620, and a detector 635 connected to the RF mixer 634. The construction and operation of the duplex radio transmitting and receiving unit 630 are identical to those of the duplex radio transmitting and receiving unit 430 in FIG. 5 and hence those will not be described in detail.

The 10.240 MHz oscillator 640 is connected to the PLL IC 621 in the transmitting and receiving PLL circuit 620 and to the RF mixer 634, for supplying the 10.240 MHz frequency to them.

The data filtering and amplifying circuit 650 includes a dual operational amplifier (OP-AMP) IC (not shown), preferably, Model LM358, and peripheral circuits (not shown), for filtering data received from the stationary apparatus 100 and applying the filtered data to the CPU 611.

The audio input/output circuit 600 is provided with a volume switch 661 connected to an output terminal of the detector 635, an audio amplifier 662 connected between the volume switch 661 and a speaker, and a microphone signal amplifying and modulating circuit 663 including its input terminal connected to the CPU 611 and to a microphone and its output terminal connected to the transmitting VCO 623 in the transmitting PLL circuit 620a.

The volume switch 661 regulates volume of the detected voice signal outputted from the detector 635 and therefore volume of the voice at the speaker.

The audio amplifier 662 is provided with a low pass filter and an amplifying IC (not shown), preferably, Model LM324, for low-noise amplifying an input signal from the volume switch 661 to drive the speaker.

The microphone signal amplifying and modulating circuit 663 includes a voice band amplifying circuit (not shown) containing a transistor and peripheral devices, such as well-known in the art, and a FM modulating oscillator (not shown). The microphone signal amplifying and modulating circuit 663 operates to amplify a voice signal inputted through the microphone and to modulate the amplified signal in accordance with data outputted from the CPU 611. Then, the microphone signal amplifying and modulating circuit 663 outputs the modulated signal to the transmitting VCO 623 in the transmitting PLL circuit 620a.

The buzzer driver 670 is connected to the CPU 611, for driving a buzzer under the control of the CPU 611.

The charging circuit 680 includes a battery 681, (+,−) charging terminals 682, and a charging detecting circuit 683 connected to the battery 681, the (+,−) charging terminals 682 and the CPU 611.

The battery 681 is a Ni-Cd cell capable of recharging energy of 3.6 V DC 280 mAH.

A more detailed construction of the charging detecting circuit 683 will be mentioned hereinafter with reference to FIG. 7B.

FIG. 7B is a detailed circuit diagram of a charging detecting circuit 683 in the portable apparatus 200 concerned with the charging of the battery in FIG. 6.

As shown in this drawing, the charging detecting circuit 683 is provided with a discharging preventing diode 708 connected between the (+) charging terminal and a charging battery 710, a switching NPN transistor 713 connected in parallel to the diode 708 and a condenser 709 connected in parallel to the battery 710. The transistor 713 includes its base connected to the (+) charging terminal via a base resistor 711, its emitter connected to ground and its collector connected to the battery 710 and the condenser 709 via a resistor 712. Also, to the collector stage of the transistor 713, a charging detecting terminal of the CPU 611 is connected, thereby enabling the CPU 611 to perceive a charging condition.

The discharging display unit 690 is connected to the charging battery 681 in the charging circuit 680, for sensing a low voltage state of the charging battery 681 to turn on a light emitting diode (not shown) contained therein.

Figure 8A:
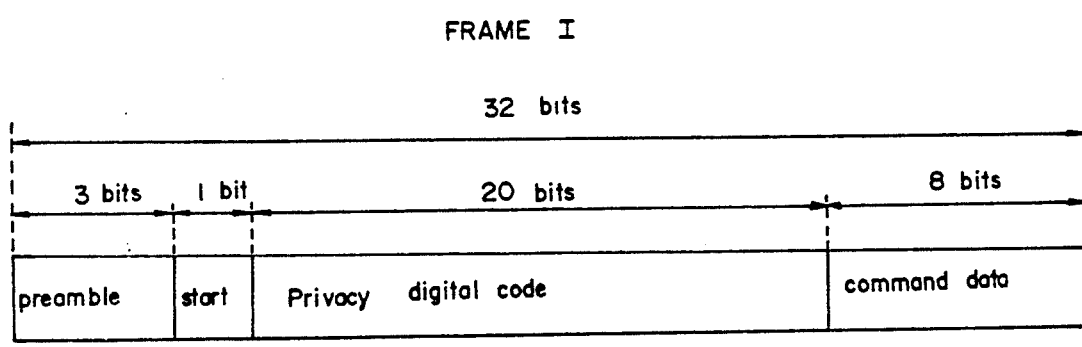
FIGS. 8A and 8B illustrate contents and structures of data frames, according to the present invention.
Figure 8B:
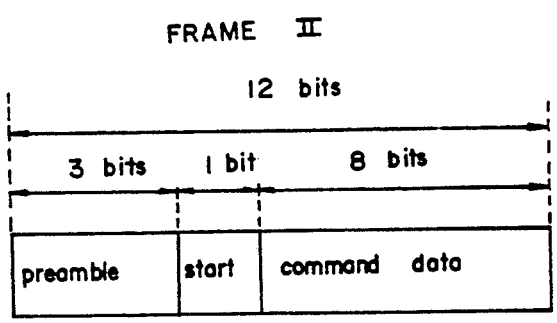

FIGS. 8A and 8B illustrate contents and structures of data frames employed for data communication in the radio-telephone system of the present invention as above-mentioned. The data frames of the preferred embodiment of the present invention can be classified into two types.

Data frame I of one type consists of total 32 bits, i.e., a permeable 3 bits, a start bit 1 bit, a privacy digital code 20 bits and command data 8 bits, as shown in FIG. 8A. When one of the stationary apparatus 100 and the portable apparatus 200 operates as an originator of call processing, the data frame I is sent out to the other apparatus as a receiver.

In the portable apparatus 200, when the talk key has been pushed for the talker's talking over the telephone, when the talk key has again been pushed for the talker's finishing of talking over the telephone, when the page key has been pushed, when the channel change key has been pushed, and when a memory code is transmitted, the date frame I containing above structure is employed. On the other hand, in the stationary apparatus 100, when a ring signal is detected and thus ring data is transmitted to the portable apparatus 200, when the page key has been pushed, and when the privacy digital code is transmitted to the portable apparatus 200 during the charging of the battery, the data frame I containing above structure is employed.

Data frame II of the other type consists of total 12 bits, i.e., a permeable 3 bits, a start bit 1 bit and command data 8 bits, as shown in FIG. 8B. In the permeable apparatus 200, as generic dial key data to be used when the talker tries to talk over the telephone and hence there is determined a talk channel between the portable apparatus 200 and the stationary apparatus 100 and as acknowledge data when the privacy digital code is received from the stationary apparatus 100 by wireless during the charging of the battery, the data frame II containing above structure is employed. On the other hand, in the stationary apparatus 100, as data to be transmitted to the portable apparatus 200 for confirmation of reception data such as talk acknowledge, memory acknowledge and etc., when the call processing from the portable apparatus 200 is initiated, the data frame II containing above structure is employed.

On the other hand, 1 byte RAMs are set in the portable apparatus 200 and the stationary apparatus 100 respectively as a mode register in which modes can be classified into a standby mode, a memory mode and a talk mode in accordance with an operation (OP) code as shown in the following Table 1 and the software has any modes in any case.

TABLE 1

| Mode Type | Operation Code | |
|---|---|---|
| standby mode | 0 | 0 |
| memory mode | 0 | 1 |
| talk mode | 0 | 2 |

In the charging of the battery, however, because the operations of the stationary and portable apparatus 100 and 200 are jumped to a software RESET routine to perform the step of clearing the RAM in the RESET routine, all flags and the register are set to zero and the standby mode is set. In this case, a location subsequent to a stack pointer of the RAM storing the privacy digital code is addressed, the stack pointer being a register instructing read out of data in a specific location of a stack memory, thereby enabling the privacy digital code in the RAM to be held even when the power of the portable apparatus 200 is turned on/off or the RAM is cleared by the software reset.

Formats as shown in the following Table 2 are registered as the transmission and reception data bank for data communication in each source program. In the Table 2, (A) is the case that the stationary apparatus 100 operates as an originator, while (B) is the case that the portable apparatus 200 operates as an originator.

TABLE 2

| Data Bank | OP-Code | Frame Structure |
|---|---|---|
| (A) | | |
| talk acknowledge | 10H | frame II |
| channel acknowledge | 11H | frame II |
| memory completion code | 12H | frame II |
| memory fail code | 13H | frame II |
| ring code | 20H | frame I |
| privacy digital code | FFH | frame I |
| (B) | | |
| standby code | 30H | frame I |
| talk code | 31H | frame I |
| channel scan code | 32H | frame I |
| memory code | 50H | frame I |
| redial | 21H | frame II |
| flash | 22H | frame II |
| channel code | 60H | frame II |
| pause | 0DH | frame II |
| privacy digital code acknowledge | FFH | frame II |

Because of number system of 8 bits (1 byte) of command data, the operation (OP) code includes 2 hexadecimal digits. During the charging of the battery, the privacy digital code change request code transmitted from the stationary apparatus 100 to the portable apparatus 200 is FFH. Upon receiving the request code FFH, the portable apparatus 200 transmits the privacy digital code change completion code FFH to the stationary apparatus 100, thereby causing the operation of a privacy digital code timer in the stationary apparatus 100 to be stopped and the privacy digital code transmission from the stationary apparatus 100 to be stopped.

Referring to FIGS. 9A and 9B, there are shown constructions of one bit of the transmission data and one bit of the reception data, respectively, according to the present invention. The bit in FIG. 9A is high (1), while the bit in FIG. 9B is low (0). The rate of the "1" bit is 125 Hz by the combination of 4 ms/4 ms and that of the "0" bit is 80 Hz by the combination of 4 ms/8 ms, as shown in FIGS. 9A and 9B.

On the other hand, the reception sampling frequency is 250 μs (4 MH) and the sampling margin is 30%.

In the preferred embodiment of the present invention, for the purpose of synchronization of the reception data different start bits are set every frame and before the start bit the waiting time is set by the permeable. Also, the data processing proceeds only when the privacy digital codes are in accord with each other, except when the FFH data indicating the privacy digital code change request code and the privacy digital code change completion code is received.

Referring to FIGS. 10A through 10F, there are shown flowcharts relating to the transmission of the privacy digital code and the reception of the acknowledge data to the privacy acknowledge data between the stationary and portable apparatus 100 and 200 in the charging of the battery, according to the present invention.

When any one of the stationary and portable apparatus 100 and 200 is charged, the other is necessarily charged, too, except for a hardware fault in the charging terminals. That is, if the charging detecting terminal of the CPU 611 connected to the charging detecting circuit 683 in the portable apparatus 200 is transited from a high state to a low state, the charging detecting terminal of the CPU 411 connected to the charging detecting circuit 453 in the stationary apparatus 100 is transited from a high state to a low state. At this time, the charging of the battery is hardwarely performed through the charging terminals hardwarely connecting the stationary apparatus 100 to the portable apparatus 200. On the other hand, in the view of the charging of the battery being softwarely performed, if the charging detecting terminals are transited from the high state to the low state, the operations of the stationary and portable apparatus 100 and 200 are jumped to a subroutine for transmission and reception of the privacy digital code to perform the corresponding program for 5 seconds.

Figure 10A:
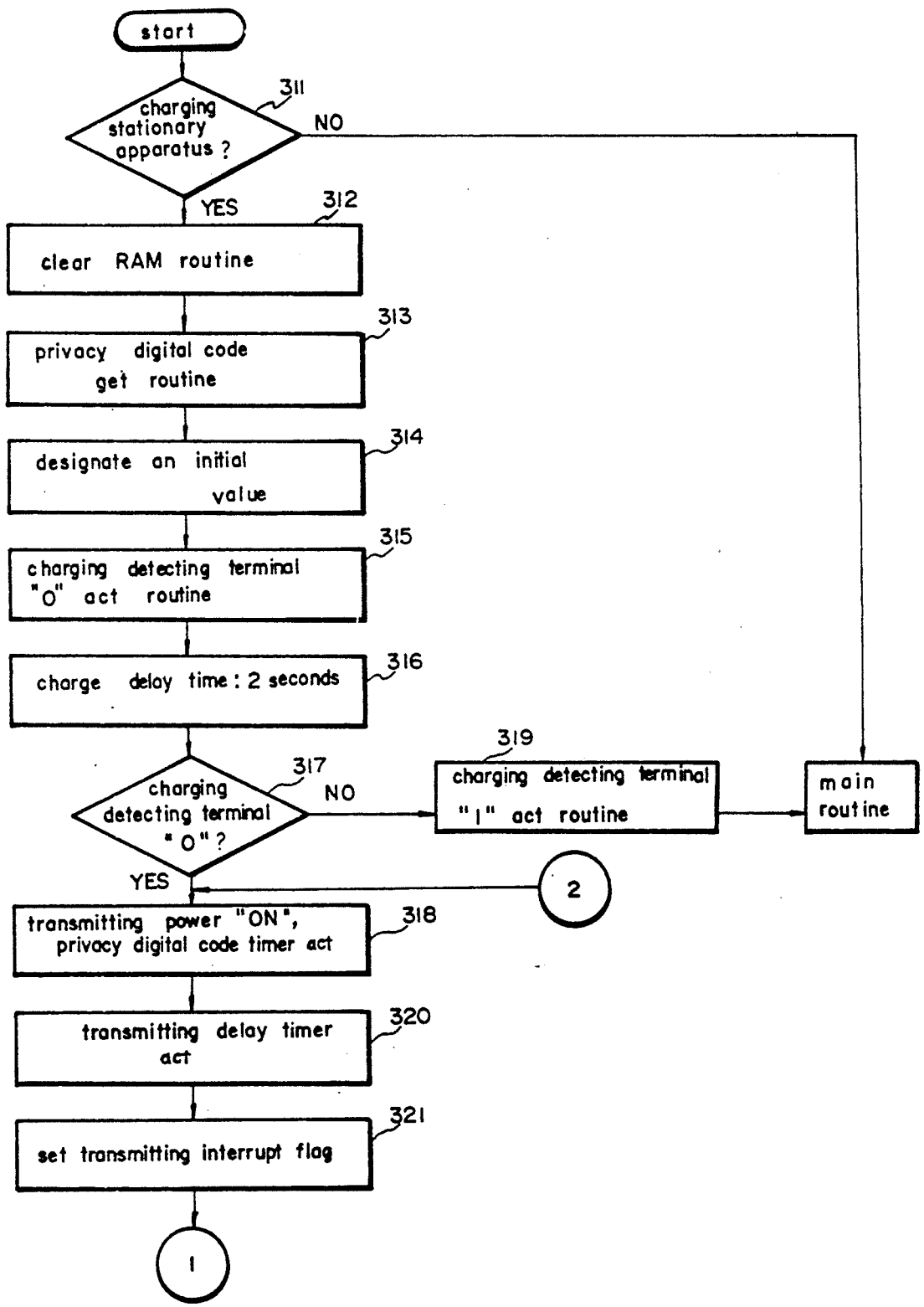

FIGS. 10A and 10B are flowcharts relating to the operation of the stationary apparatus 100.

First, the stationary apparatus 100 sets the current mode register, or RAM to zero and clears all flags to zero at step 312. Then, the stationary apparatus 100 performs a privacy digital code get routine at step 313, designates an initial value at step 314 and performs an operation routine according to the low (0) state of the charging detecting terminal at step 315. Thereafter, the stationary apparatus 100 has a charging delay time period for 2 seconds at step 316, for preventing a chattering which may occur during the contact between the charging terminals of the stationary and portable apparatus 100 and 200.

Then, the stationary apparatus 100 continues to monitor the state of the charging detecting terminal at step 317. If the charging detecting terminal is transited from the low (0) state to the high (1) state during the charging delay time period, the operation of the stationary apparatus 100 at the current subroutine is jumped to a normal cradle off routine. Namely, the stationary apparatus 100 performs an operation routine according to the high (1) state of the charging detecting terminal at step 319 and then the operation thereof is jumped to a main routine. In the subroutine for transmission and reception of the privacy digital code, the ring signal detect and all function senses are interrupted, so that the perfect privacy digital code transmitting and receiving system is established.

If the charging detecting terminal continues to maintain the low, or "0" state even after the charging delay time lapsed, that is, if the charging of the battery is continued, the following privacy digital code transmitting program is executed.

First, the transmitting power in the transmitting circuit is turned on for the radio communication at step 318 and the data of the frame I of FIG. 8A is transmitted to the portable apparatus 200 at step 320 after delaying of the time period for 200 ms set to a stable time of the transmitting VCO 423 at step 319. At the same time as the turning on of the transmitting power, a 700 ms privacy digital code timer is driven and a privacy digital code counter inputs value "5" so that the privacy digital code can be transmitted 5 times.

The stationary apparatus 100 checks whether the permeable and the start bit are present among data received by wireless from the portable apparatus 200 at steps 321 and 322 and then whether the privacy digital code change completion data, or the operation code FFH has been received at step 323. If the privacy digital code change completion data, or the operation code FFH has been received, the operation of the privacy digital code timer is stopped for completion of the current subroutine at step 324 and the operation of the stationary apparatus 100 is jumped to the main routine. If not so, it is determined if the value of the privacy digital code counter decremented by one is zero at step 325. Unless the value of the privacy digital code counter decremented by one is zero, the transmitting operation of the privacy digital code change request data is performed repeatedly by up to 5 times until the privacy digital code change completion data is received. Unless the privacy digital code change completion data is yet received even through 5 times repetition, the stationary apparatus 100 determines the power of the portable apparatus 200 was turned off and sets an OFF-flag in accordance with the determined result at step 326. Therefore, the stationary apparatus 100 can prevent an auto-talk upon detecting the ring signal during the charging of the battery at step 366 and perform the normal cradle off operation at step 365, as shown in FIG. 10E.

Figure 10C:
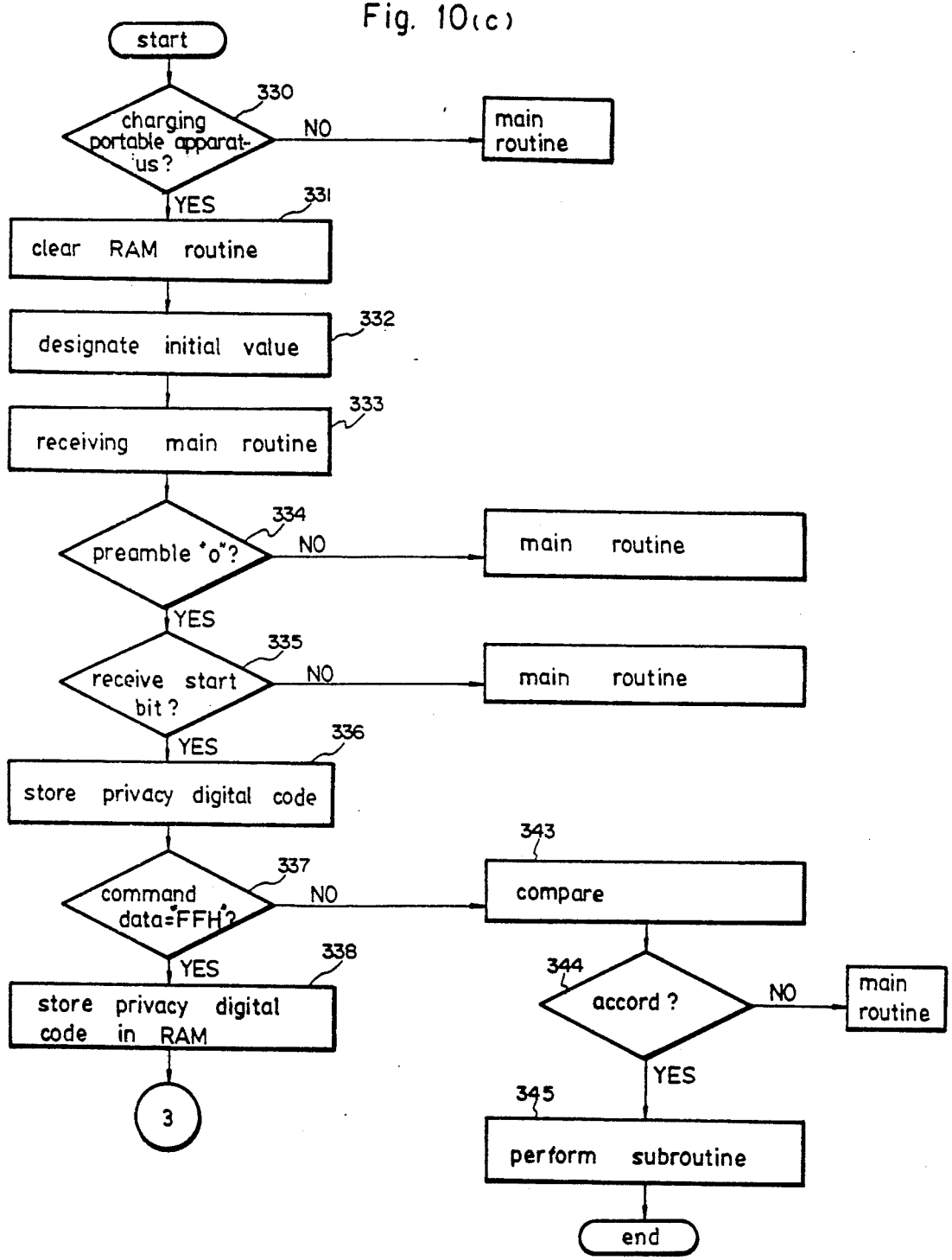
Figure 10D:
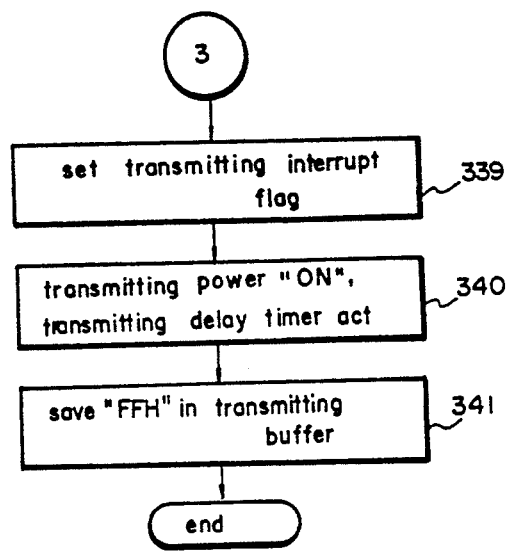
Figure 10E:
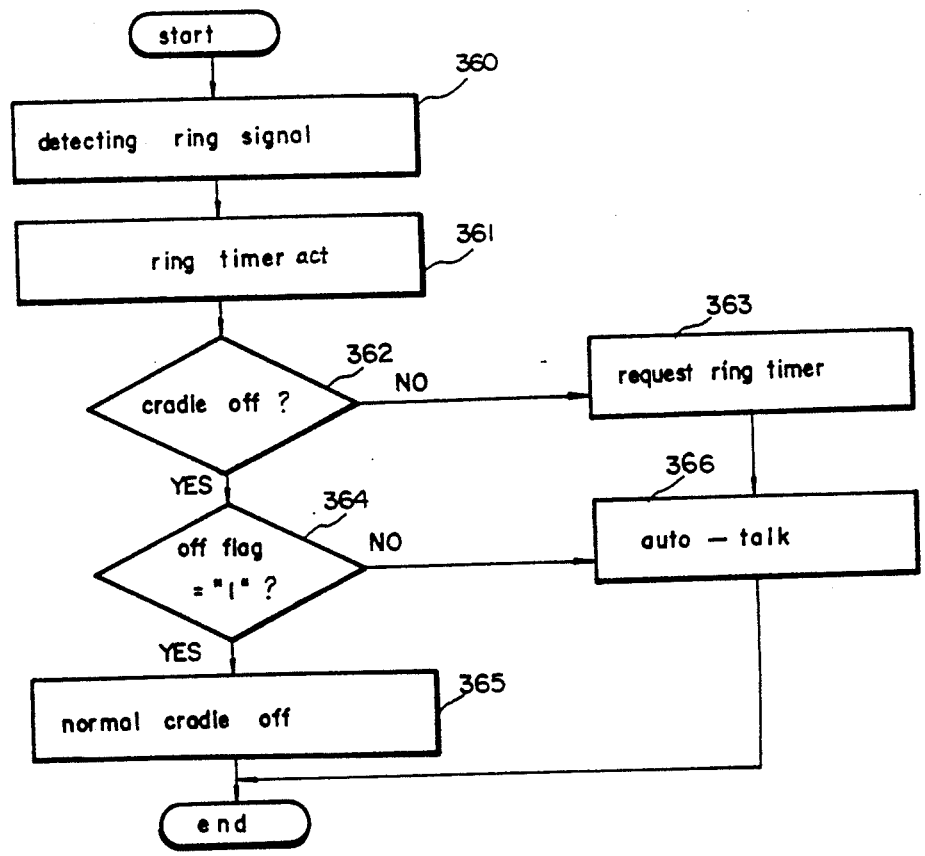

FIGS. 10C and 10D are flowcharts relating to the operation of the portable apparatus 200.

First, upon determining through the charging detecting terminal of the CPU 611 connected to the charging detecting circuit 683 that the battery 681 is being charged at step 330, the portable apparatus 220 performs a RAM clear routine except 3 bytes of the RAM corresponding to the privacy digital code at step 331, designates an initial value at step 332 and performs a receiving main routine of reception data transmitted from the stationary apparatus 100 at step 333. Then, the portable apparatus 200 checks whether the permeable and the start bit are present among data received by wireless from the stationary apparatus 100 at steps 334 and 335. If the permeable and the start bit are present among the received data, the privacy digital code is stored in a receiving buffer at step 336. Thereafter, it is determined if the command data existing among the received data is in accord with the privacy digital code change request data, or the operation code FFH, i.e., if the privacy digital code change request data FFH has been received at step 337. If the command data existing among the received data is in accord with the privacy digital code change request data FFH, the privacy digital code previously stored in the receiving buffer is stored in the RAM at step 338 and a transmission interrupt flag is set at step 339. Thereafter, the transmitting power in the transmitting circuit is turned on for the radio communication and delaying of the time period for 200 ms set to a stable time of the transmitting VCO 623 lapses at step 340. After delaying of the time period for 200 ms, the privacy digital code change request data FFH is saved in a transmitting buffer at step 341 and the privacy digital code change completion data of the frame II in FIG. 8B is transmitted to the stationary apparatus 100. On the other hand, if the command data existing among the received data is not in accord with the privacy digital code change request data FFH, the privacy digital code in the receiving buffer is compared with contents in the RAM at step 343. If the privacy digital code in the receiving buffer is in accord with contents in the RAM, an operation according to the command data is performed for completion of the current subroutine at step 345; if not so, the operation of the portable apparatus 200 is jumped to the main routine.

On the other hand, in case that the power supply of the stationary apparatus 100 is cut off or reset while the portable apparatus 200 is put on the stationary apparatus 200 for the charging of the battery, the subroutine for transmission and reception of the privacy digital code is performed once more again.

Figure 10F:
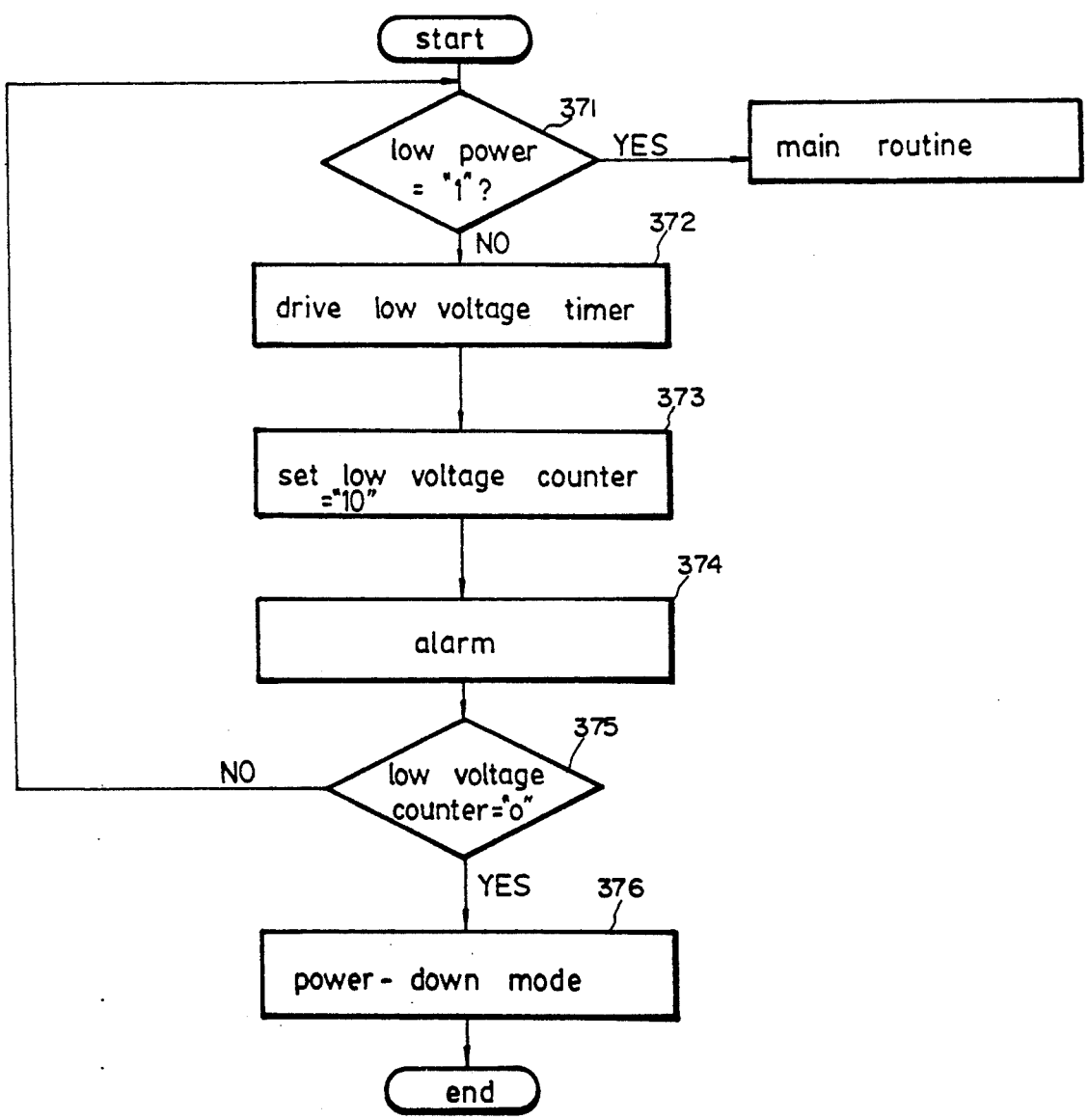

The portable apparatus 200 normally operates with the use of the battery power except the low power of the battery, as shown in FIG. 10F. However, if the low power of the battery is sensed at step 371, a low voltage timer is driven at step 372, a low voltage counter is set to value "10" at step 373 and therefore an alarm is given 10 times at an interval of one second at steps 374 and 375. Thereafter, the operation of the portable apparatus 200 is jumped to a power-down mode at step 376. Of course in the power-down mode, the normal routine is performed for 10 seconds and hence the transmission and reception of the privacy digital code is enabled for that time period. Even though the portable apparatus 200 is woken up by a hardware reset in the power off thereof or in the power-down mode resulted from the low power of the battery, the privacy digital code is kept stored in the RAM. Therefore, there is no necessity for recharging for the transmission and reception of the privacy digital code.

As hereinbefore described, the present invention provides the radio-telephone system comprising the stationary and portable apparatus each including the CPU IC and the 10 channel PLL IC applied thereto. Therefore, according to the present invention, the selection of the talk channel having no crosstalk by the system software is enabled. Also, the system according to the present invention allows the stationary and portable apparatus to contain a identification code. Therefore, first in confirmation of the identification code in decision of the talk channel, the present system can prevent a misconnection between the stationary and portable apparatus in the course of a talker's talking over the telephone.

In addition, in accordance with the present invention, every when the portable apparatus is put on the stationary apparatus for the charging of the battery, new channel setting and new privacy digital code granting are performed by wireless through the antennas A and A' and hence the interstoring procedure is automatically performed between the stationary and portable apparatus, thereby enabling the enhancing of function and processing speed of the system. Therefore, the present system and method may be applied to all radio-communication equipments including the prior radio-telephone systems.

Although the preferred embodiments of the invention have been disclosed for illustrative purpose, those skilled in the art will appreciate that various modifications, additions and substitutions are possible, without departing from the scope and spirit of the invention as disclosed in the accompanying claims.

What is claimed is:

1. A method of changing a privacy digital code in a radio-telephone system, the radio-telephone system employing a manner of changing a channel and a privacy digital code and interstoring them by wireless, said system having a stationary apparatus connected to a standard telephone line and portable apparatus connected by wireless to the stationary apparatus for transmission and reception of voice and data, said stationary and portable apparatus each having (+,−) charging terminals, wherein said stationary apparatus comprises: base MPU means containing a first ROM for storing software for controlling the whole operation of the system and also containing a second RAM; charging power supply and sensing means connected between said base MPU means and said stationary apparatus (+,−) charging terminals, for supplying a charging power to said stationary apparatus (+,−) charging terminals and sensing a contact of said stationary apparatus (+,−) charging terminals with said portable apparatus (+,−) charging terminals to output an acknowledge signal in accordance with the sensed result to said base MPU means; first duplex radio transmitting and receiving means connected to said base MPU means, for transmitting and receiving a generic voice signal and transmitting a selected channel and privacy digital code data to said portable apparatus and receiving reception completion signal data from said portable apparatus under a control of said base MPU means; first transmitting and receiving PLL means connected to said base MPU means and to said first duplex radio transmitting and receiving means, for determining a plurality of transmission and reception channel frequencies in accordance with channel data from said base MPU means and removing a frequency error in a PLL manner to perform a channel locking; line connecting means connected among said base MPU means, said first duplex radio transmitting and receiving means and said standard telephone line, for providing intercommunication with a generic telephone network; and first antenna means connected to said first duplex radio transmitting and receiving means; and wherein said portable apparatus comprises: hand MPU means containing a first RAM for storing the privacy digital code given by said base MPU means in said stationary apparatus; second duplex radio transmitting and receiving means connected to said hand MPU means, for receiving the selected channel and the privacy digital code data transmitted from said stationary apparatus in the charging of its battery and performing the signal transmission and reception from and/or to said stationary apparatus having the same code; second transmitting and receiving PLL means connected to said hand MPU means and to said second duplex radio transmitting and receiving means, for determining a plurality of transmission and reception channel frequencies in accordance with channel data from said hand MPU means and removing a frequency error in a PLL manner to perform a channel locking; charging means connected to said portable apparatus (+,−) charging terminals, for supplying a charged power to said hand MPU means and said second duplex radio transmitting and receiving means; and second antenna means connected to said second duplex radio transmitting and receiving means; said method comprising the steps of:

(a) setting said second RAM to zero, clearing all flags to zero, performing a privacy digital code get routine, designating an initial value and performing a charging delay for a constant time period, during the contact between said charging terminals of said stationary and portable apparatus for the charging of the battery, in said stationary apparatus; and performing a first RAM clear routine and designating an initial value, in said portable apparatus;

(b) checking if the charging state is continuously maintained after the charging delay for the constant time period, in said stationary apparatus;

(c) performing a privacy digital code transmitting program, in said stationary apparatus; and performing a receiving main routine, in said portable apparatus;

(d) checking whether a preamble and a start bit are present among data received by wireless from said stationary apparatus, storing the privacy digital code in a receiving buffer if a preamble and a start bit are present among the received data from said stationary apparatus, determining if command data existing among the received data is in accord with privacy digital code change request data, performing a privacy digital code change completion data transmitting program if the command data existing among the received data is in accord with the privacy digital code change request data, comparing the privacy digital code in said receiving buffer with contents in said first RAM if the command data existing among the received data is not in accord with the privacy digital code change request data, and performing an operation according to the command data only when the privacy digital code in said receiving buffer is in accord with contents in said first RAM, in said portable apparatus; and (e) checking whether a preamble and a start bit are present among data received by wireless from said portable apparatus and then whether the privacy digital code change completion data has been received, and unless the privacy digital code change completion data is received, performing repeatedly a transmitting operation of the privacy digital code change request data until the privacy digital code change completion data is received, in said stationary apparatus.

2. A method of changing the privacy digital code by using the radio-telephone system of claim 1, wherein said step (a) includes the step of having a charging delay time period for 2 seconds, for preventing a chattering which may occur during the contact between said charging terminals of said stationary and portable apparatus for the charging of the battery, in said stationary apparatus.

3. A method of changing the privacy digital code by using the radio-telephone system of claim 1, wherein said step (a) includes the step of performing the first RAM clear routine except 3 bytes of said first RAM corresponding to the privacy digital code, in said portable apparatus.

4. A method of changing the privacy digital code by using the radio-telephone system of claim 1, wherein a format of the received data from said stationary apparatus to said portable apparatus at said step (d) consists of the preamble 3 bits, the start bit 1 bit, the privacy digital code 20 bits and the command data 8 bits.

5. A method of changing the privacy digital code by using the radio-telephone system of claim 1, wherein a format of the received data from said portable apparatus to said stationary apparatus at said step (e) consists of the preamble 3 bits, the start bit 1 bit, and the command data 8 bits.

6. A method of changing the privacy digital code by using the radio-telephone system of claim 1, wherein said step (e) includes the step of applying value "5" to a privacy digital code counter to perform the transmitting operation of the privacy digital code change request data repeatedly by up to 5 times until the privacy digital code change completion data is received.

7. A method of changing the privacy digital code by using the radio-telephone system of claim 1, further comprising the step of:

(f) unless the privacy digital code change completion data is yet received even through 5 times repetition at said step (e), determining the power of said portable apparatus was turned off, setting an OFF-flag in accordance with the determined result to prevent an auto-talk upon detecting a ring signal during the charging of the battery and performing a normal cradle off operation.

8. A method of changing the privacy digital code by using the radio-telephone system of claim 3, further comprising the step of:

(g) keeping the privacy digital code stored in said first RAM, in the power off of said portable apparatus or in a power-down mode resulted from a low power of the battery.

* * * * *